United States Patent [19]

Neumann et al.

[11] Patent Number: 5,621,877
[45] Date of Patent: *Apr. 15, 1997

[54] REWINDING TIME-BASED SCRIPT SEQUENCES

[75] Inventors: Erik R. Neumann, Redwood City; Albert J. Fenton, III, San Jose, both of Calif.

[73] Assignee: Object Technology Licensing Corporation, Cupertino, Calif.

[*] Notice: The term of this patent shall not extend beyond the expiration date of Pat. No. 5,475,811.

[21] Appl. No.: 510,131

[22] Filed: Oct. 13, 1995

Related U.S. Application Data

[63] Continuation of Ser. No. 305,793, Sep. 13, 1994, Pat. No. 5,475,811, which is a continuation of Ser. No. 40,479, Mar. 31, 1993, abandoned.

[51] Int. Cl.⁶ .................................................. G06F 15/00
[52] U.S. Cl. .......................... 395/326; 395/173; 395/806
[58] Field of Search .................................. 395/153, 154, 395/155, 161, 145, 146, 147, 152, 157

[56] References Cited

U.S. PATENT DOCUMENTS

| | | | |
|---|---|---|---|
| 4,821,220 | 4/1989 | Duisberg | 364/578 |
| 5,247,651 | 9/1993 | Clarisse | 395/500 |
| 5,261,041 | 11/1993 | Susman | 395/152 |

*Primary Examiner*—Raymond J. Bayerl
*Assistant Examiner*—Huynh Ba
*Attorney, Agent, or Firm*—Irell & Manella LLP

[57] ABSTRACT

The system of the present invention provides a mechanism for executing a script sequence containing a plurality of commands and associated time for executing the commands. The system allows a user of the script sequence to specify an arbitrary time, either forward or backward from a current time, and the result of the execution reflects the cumulative effects of executing the script sequence from the beginning up to the arbitrary time. The system provides for a skip ahead mechanism in which commands are executed without waiting for the occurrence of their associated time. The system also provides for rewind and key-frame features.

7 Claims, 2 Drawing Sheets

```
CREATE OVAL, LOCATION: X=0, Y=0;

WAIT (10 UNITS);

PERFORM FIVE TIMES
    ( MOVE OVAL (X = 1 UNIT)
      WAIT (10 UNITS)         );

REMOVE OVAL.
```

REWINDING TIME-BASED SCRIPT SEQUENCES

This is a continuation of application Ser. No. 08/305,793, filed Sep. 13, 1994 now U.S. Pat. No. 5,475,811, which is a continuation of application Ser. No. 08/040,479, filed Mar. 31, 1993, now abandoned.

BACKGROUND OF THE INVENTION

The present invention relates to time-based programming and more particularly to the implementation of time-based sequences for controlling interactive media in an object oriented programming environment.

Authors of computer-based multimedia presentations (titles) need to create time-based sequences of events, such as displaying text, graphics, sounds, animations and video, as well as user interface elements for controlling their titles. Authors need to build these time-based sequences using convenient tools without having to learn complex programming techniques. At the same time, authors want the flexibility to write scripts, using a powerful time-based programming (scripting) language, to maintain precise control over the functionality of these sequences.

An exemplary prior art scripting language incorporating time-based sequences can be found in MacroMind Director published by MacroMedia. It allows authors to create time-based displays of text, graphics, sounds, animations, and video with user interface elements. It uses a time-based "score" metaphor with 24 channels of animation over time. It also includes a cast window for storing the artwork and sounds that are used in the course of the presentation.

MacroMind Director has a powerful set of functions, but is limited in what can be animated over time. Only those characteristics of objects that are controllable from the score can be changed over time. For example, if a bitmap object is in one of the channels, only certain predetermined aspects of the bitmap can be changed, such as its position on the screen, its size (scaling), its transfer or "ink" mode (e.g., matte, copy, xor, etc.), its colorization, the script which executes when a user clicks on it, and which bitmap from the cast is being displayed. Even though these are powerful capabilities, it is desirable not to be limited by these predetermined functions.

MacroMind Director also has the ability to execute a certain user script in each frame. However, this ability is outside of the score metaphor and is not sufficiently flexible or powerful to enable authors to control events across frames, much less arbitrary events. For example, it does not maintain the cumulative effects of previous frame scripts.

Another product which facilitates the creation of time-based sequences is Apple's Quicktime system software, utilized by authoring tools such as Adobe's Premier. Quicktime allows an author to edit and play back time-based video and sound, but does not provide a mechanism to precisely control the playback of other media or the execution of arbitrary sequences of code.

SUMMARY OF THE INVENTION

Broadly stated, the present invention is directed to a system that synchronizes the execution of arbitrary sequences of code to units of time. The system is implemented at least partially within a scripting language for controlling interactive media in an object-oriented programming environment. The system contains means for playing media, such as displaying full-motion video or animation sequences on a computer monitor or playing a sequence of audio through a speaker connected to the computer. The system is capable of executing a script sequence, such as a sequence of commands in a scripting language. The system also contains means for generating a sequence player object for keeping track of time during the execution of the script sequence. The system also contains means for generating at least one tagged object which has a tag for associating the tagged object with the sequence player object. The system can then, for example, display the tagged object at the predetermined time specified in the script sequence.

In one embodiment of the present invention, the system provides means for jumping to an arbitrary point in time during execution of the script sequence (while maintaining the cumulative effects of commands executed prior to that time), as well as delaying execution until an arbitrary number of units of time has elapsed. In another embodiment of the present invention, the system contains means for removing all tagged objects in the environment. After removing all the tagged objects, the system can then return to the starting point of the script sequence immediately and skip ahead the script sequence to a time earlier than the time when the tagged objects are removed. As a result, a rewind operation can be performed. In yet another embodiment of the present invention, the system contains means for generating a key frame script that replicates the current state of the environment. This key frame script can be invoked at any time to replicate the environment without having to execute a long string of commands in the script sequence.

Therefore, it is an object of the present invention to provide a simple yet powerful programming environment to multimedia authors.

It is another object of the present invention to provide a flexible time-based programming language to multimedia authors.

It is a further object of the present invention to provide a time-based programming language including conditional statements.

It is yet another object of the present invention to provide for jumping to an arbitrary point in a time-based script sequence.

It is also an object of the present invention to provide a rewind feature to a time-based script sequence.

It is a further object of the present invention to include a key frame script in a time-based programming environment.

Other objects, advantages, and features of the present invention will become apparent to those skilled in the art from the following specification when taken in conjunction with the accompanying drawings.

DETAILED DESCRIPTION OF PREFERRED EMBODIMENTS

Figure 1:
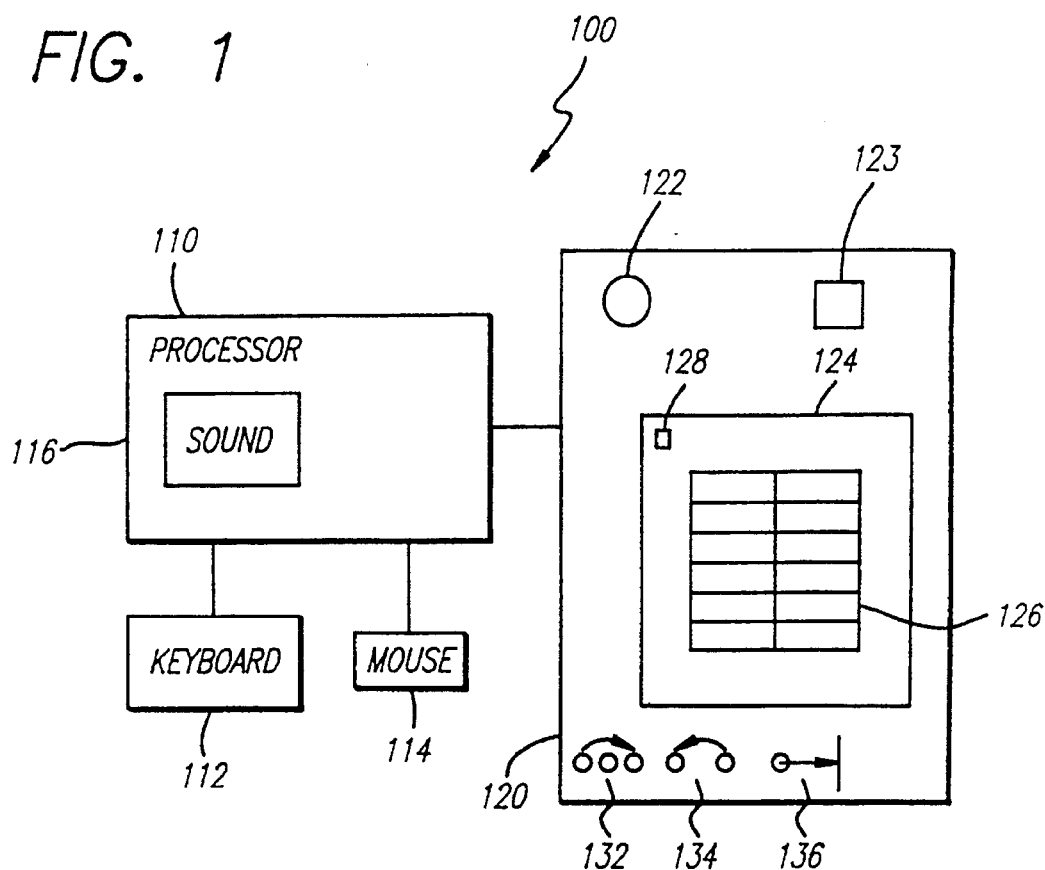
FIG. 1 is a drawing showing a computer system operating in an object oriented multimedia environment according to the present invention.

FIG. 1 is a drawing showing a computer system 100 operating in an object oriented multimedia environment.

System 100 comprises a processor unit 110, a keyboard 112, a pointing device (such as a mouse 114) and a monitor 120. Processor unit 110 preferably contains a central processor unit, memory, and other components for performing digital processing operations. Processor unit 110 further contains a sound unit 116 for generating audio outputs in the multimedia environment. Different peripheral devices, such as video systems (not shown), can also be advantageously coupled to processor unit 110.

Monitor 120 is used to display various objects in the multimedia environment. Examples of objects are an oval 122, a square 123 and a window 124 for separating a portion of the display area of monitor 120 from the rest of the display area. In FIG. 1, window 124 displays a script sequence 126, the details of which will be described below. Window 124 also displays a cursor 128 which is preferably controlled by mouse 114. Monitor 120 may also display one or more icons, shown as reference numerals 132, 134, and 136, for visually representing various objects and methods commonly used by a user.

Figure 2:
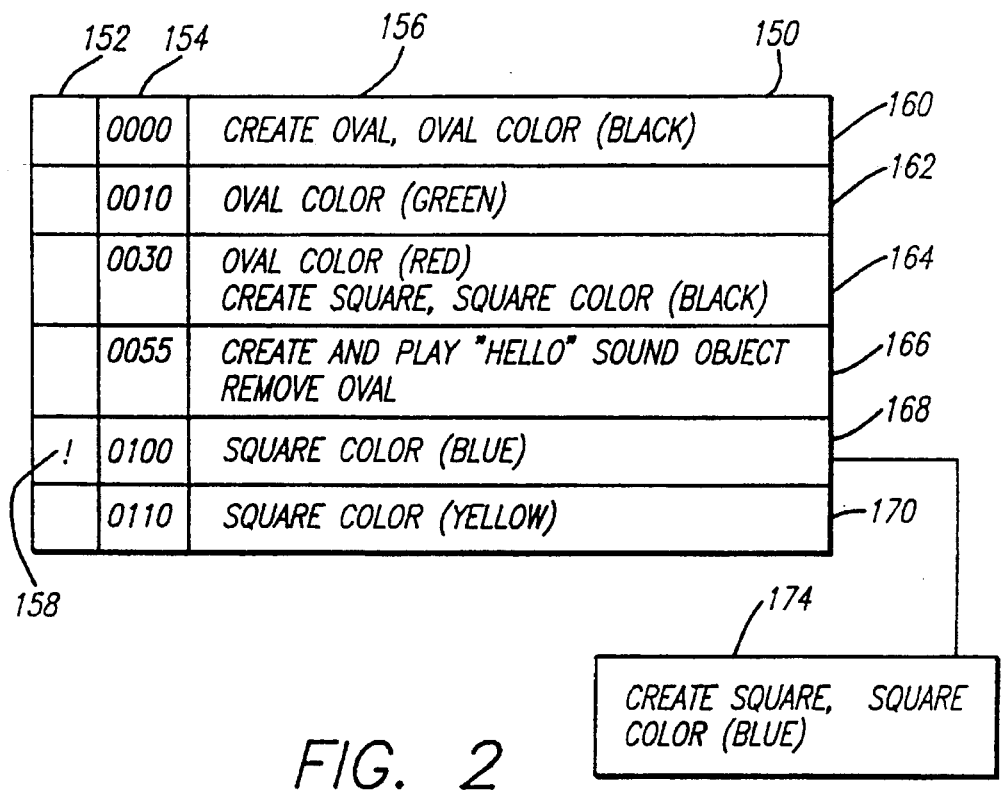
FIG. 2 shows an example script sequence and a key frame script according to the present invention.

FIG. 2 shows an example of a script sequence 150, written in pseudo code form, and an associated key frame script 174. Script sequence 150 contains a list of commands and the associated time for performing the same. A user may enter code sequence 150 into computer system 100 using, e.g., an event editor, which is a table-like template containing rows and columns. The user preferably types in the time and activities using keyboard 112. However, the user can also retrieve a pre-written script sequence from memory. The details of key frame script 174 will be described below.

Script sequence 150 contains a playback-head column 152, a time sequence column 154 and an activity column 156. Script sequence 150 also contains a plurality of rows. Each row contains a value in the time sequence column 154 representing time and one or more commands in the activity column 156 representing the activities to be initiated at the corresponding time. The commands used in activity column 156 for creating, modifying, and disposing of activities are preferably commands in an object oriented scripting language. Script sequence 150 also shows a playback-head 158 in row 168 of playback-head column 152. The function of playback-head 158 will be described below.

Script sequence 150 is a simple sequence which is used to illustrate the invention. The first row, row 160, of script sequence 150 shows a time "0000" in the time sequence column 154 and an activity of "create oval, oval color (black)" in the activity column 156. It indicates that when time is equal to 0 units, an oval object, such as object 122 of FIG. 1, is created and its color is black. The second row, row 162, indicates that when time is equal to 10 units, the color of oval object 122 changes to green. The third row, row 164, indicates that when time is equal to 30 units, the color of oval object 122 changes to red. At the same time, a square object, such as object 123 of FIG. 1, is created. The fourth row, row 166, indicates that when time is equal to 55 units, a "hello" sound object, which plays the sound "hello," is created. At the same time, oval object 122 is removed. The fifth row, row 168, indicates that when time is equal to 100 units, the color of square object 123 changes to blue. In this example, the length of time for playing the sound "hello" is assumed to be twenty time units. Thus, the action of the sound object is completed before this time. Finally, the sixth row, row 170, indicates that when time is equal to 110 units, the color of square object 123 changes to yellow.

An exemplary way for a user to execute script sequence 150 is to move cursor 128 to a predefined icon representing "play", such as icon 136, and click on mouse 114. The "play" instruction causes computer system 100 to send a "play" message to script sequence 150. As a result, script sequence 150 executes from beginning (i.e., time equals "0000") to end (i.e., time equals "0110"). The user will see and hear the following events: (1) A black oval (122) is created immediately. (2) When time is equal to 10 units, the color of oval 122 turns green. (3) When time is equal to 30 units, the color of oval 122 turns red. At the same time, a black square (123) appears on monitor 120. (4) When time is equal to 55 units, the word "hello" can be heard. At the same time, oval 122 disappears from monitor 120. (5) When time is equal to 100 units, the color of square object 123 turns blue. (6) When time is equal to 110 units, the color of square object 123 turns yellow.

Figures 3, 4:
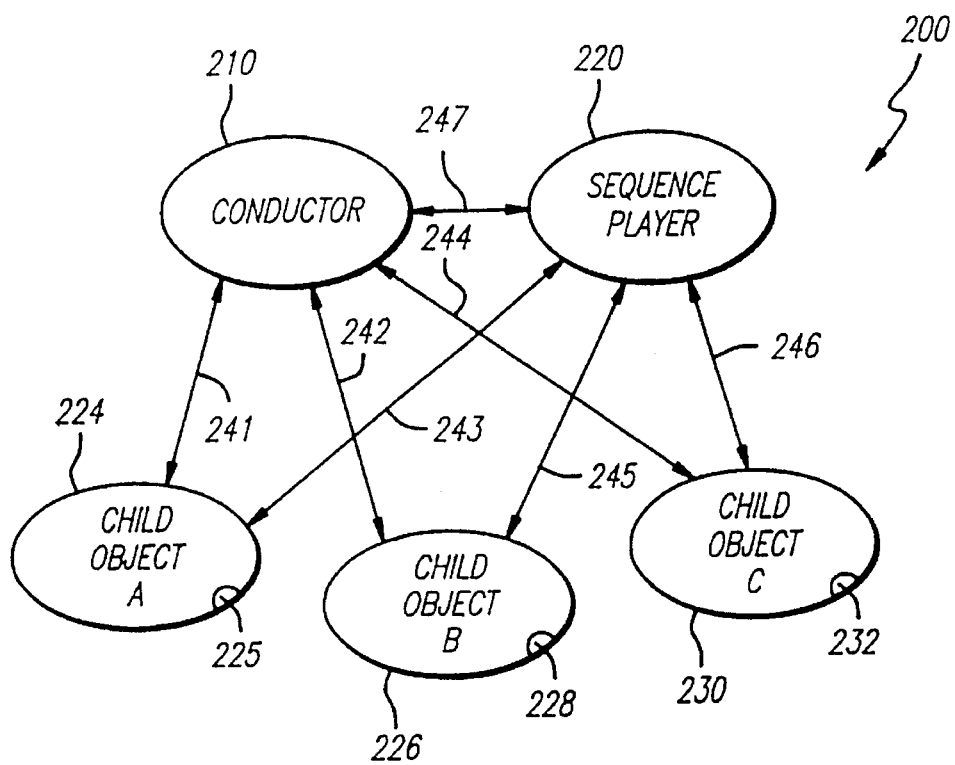
FIG. 3 is a drawing showing the object oriented programming environment of the present invention.
FIG. 4 shows a script sequence containing a conditional statement according to the present invention.

The object oriented environment responsible for the operation of script sequence 150 is now described. FIG. 3 shows an object oriented programming system 200 which resides in computer system 100. Programming system 200 comprises a conductor object 210 and a sequence player object 220. Conductor object 210 has a list of objects that are active, issues them messages, and coordinates their use of shared resources such as monitor 120, user events and CPU cycles. Conductor object 210 is responsible for the smooth updating of the screen of monitor 120 by compositing the objects together on the screen in an efficient manner. For example, conductor object 210 preferably updates only those areas of the screen that have changed.

Sequence player object 220 is an object which is derived from the player class which is itself derived from the clock class (not shown, but discussed in greater detail in copending patent application Ser. No. 08/041,395 entitled Synchronized Clocks and Media Players, which is incorporated by reference herein). Thus, it can keep time for a script sequence, such as script sequence 150. In the preferred embodiment, sequence player object 220 is able to keep track of time in various forms (e.g., absolute time and relative time) and in different types of units (such as milliseconds, 1/60ths of a second, etc.). In other words, sequence player object 220 is an object that is also a clock for its corresponding script sequence.

The structure of sequence player object 220 is disclosed in the above described copending patent application. The class hierarchy and other relationships among player, clock and related classes, and the manner in which these classes of objects keep track of time, is also discussed in greater detail in the above described copending patent application. Also shown are the methods that can be performed by script sequence players (such as "playing" or executing a script sequence at a particular rate), many of which are discussed below by example.

In one embodiment to this invention, the script sequence is implemented as a separate thread of execution. This implementation allows for efficient script execution as well as exploitation of a variety of existing programming facilities, such as nested loops, subroutine calls, etc. In other embodiments, threads are not necessary, and the script sequence can be broken into fragments, each of which can be executed when its time arrives. In still another embodiment, script sequences could be replaced with subsets of script methods, such as position and appearance changes.

During the execution of a script sequence, such as script sequence 150, objects are created in response to instructions from sequence player object 220. These objects are called the "children" of sequence player object 220. In script sequence 150, three children are created. They are child A (224) representing oval object 122, child B (226) representing square object 123, and child C (230) representing "hello" sound object. Each child object has a "tag" indicating that it is a "child" of sequence player object 220. Thus, children objects A (224), B (226), and C (230) have tags 225, 228, and 232, respectively. The effect of giving each object a unique tag can also be obtained by instead maintaining a list of each child object created by a particular player. The objects in FIG. 3 can communicate with one another using messages, shown in FIG. 3 as lines 241–247.

When script sequence 150 is executed, sequence player object 220 is associated with script sequence 150. When time is equal to "0000," i.e. zero units, sequence player object 220 causes oval object 122 to be created. The color of oval object 122 is black. As explained above, oval object 122 contains tag 225 indicating that it is a child of sequence player object 220. Oval object 122 is added to the list maintained by conductor object 210. Oval object 122 appears on the screen of monitor 120 after the screen is updated by conductor object 210. Sequence player object 220 functions as a clock for script sequence 150 wherein time is advanced continuously. Since the next activity according to script sequence 150 occurs when time is equal to ten units, no further action is taken before that time is reached.

When sequence player object 220 indicates that time has reached ten units, it executes the script associated with that point in time, which changes the color of oval object 122 to green. Conductor object 210 then updates the screen of monitor 120 so that oval object 122 turns green. Computer system 100 waits for twenty time units while sequence player object 220 continues to keep track of time. When sequence player object 220 indicates that the time has reached 30 units, it executes the script associated with that point in time, which changes the color of oval object 122 to red. At the same time, sequence player object 220 causes square object 123 to be created and added to the list of conductor object 210. Square object 123 contains tag 228 indicating that it is a child of sequence player object 220. Conductor object 210 updates the screen of monitor 120 to reflect the changes.

Computer system 100 then waits for twenty five time units while sequence player object 220 continues to keep track of time. When sequence player object 220 indicates that time has reached 55 units, sequence player object 220 causes sound object 230 to be created and added to the list of conductor object 210. Sound object 230 also contains tag 232 indicating that it is a child of sequence player object 220. At the same time, sequence player object 210 causes oval object 122 to be removed from the list of conductor object 210. Conductor object 210 is notified of the changes. As a result, the word "hello" is produced by sound unit 116 and oval object 122 disappears from the screen of monitor 120.

Computer system 100 then waits for forty five time units while sequence player object 220 continues to keep track of time. When sequence player object 220 indicates that the time has reached 100 units, it executes the script associated with that point in time, which changes the color of square object 123 to blue. Conductor object 210 then updates the screen of monitor 120 to reflect the change. Computer system 100 then waits for ten more time units while sequence player object 220 continues to keep track of time. When sequence player object 200 indicates that the time has reached 110 units, it executes the script associated with that point in time, which changes the color of square object 123 to yellow. Conductor object 210 then updates the screen of monitor 120 accordingly.

Script sequence 150 allows a user to write a sequence of time-based commands easily. These commands create and remove objects, as well as setting their various characteristics, over time. As explained below, the commands could include "skip ahead," "rewind," and conditional commands which are similar to a "do-loop" or a "for-loop" used in many programming languages. Thus, the script sequence according to the present invention is a very flexible system which allows a user to use a simple yet powerful object oriented language to create a multimedia title.

The operation of the "skip ahead" command will now be described. When a script sequence is executed in the regular manner, the system waits for a specified time before an activity takes place. For example, after a black oval 122 has been created (when script sequence 150 starts), the system waits for ten time units before changing the color of oval 122 to green because the value indicated in the time sequence column 154 of script sequence 150 is "0010." In "skip ahead" mode the system does not wait for the time indicated by the time sequence column 154. Instead, the system performs all the activities indicated in the activity column 156 sequentially (without waiting) until a predefined time designated by the user is reached.

The user can initiate "skip ahead" (i.e., skip in any direction to time "x") by moving cursor 128 to the playback-head column 152 of one of the rows, say row 168, of script sequence 150 and then clicking on mouse 114. When execution of script sequence 150 starts, the current time of sequence player object 220 is set to the predefined time set by the user, i.e., 100 time units. This time (i.e., any arbitrary time) could also be determined by the author of the title or input by the user while the title is being executed.

In one embodiment, the "skip ahead" command is implemented in (and invoked through) the SetTime method, which sets the script sequence player's time—i.e., by rewinding the script sequence to the beginning and executing until the specified time. When script sequence 150 is executed sequentially under "skip ahead," there is no "waiting" at rows 162, 164 and 166 because the time corresponding to each of these three rows is less than the current time indicated by sequence player object 220. The conductor object 210 is not notified of the existence and status of the oval, square, and sound objects prior to the time execution reaches row 168. Consequently, these objects are not composited (i.e., the screen of monitor 120 does not show the oval and square objects and the sound unit 116 does not play the word "hello."). When script sequence 150 reaches the destination at row 168, the existence and the status of the square object is communicated to conductor object 210. From the viewpoint of the user, he/she only sees a blue square object on the screen of monitor 120. As a result, the system "skips ahead" to time equals to 100 units. In this manner, the system can "jump" to any particular point in time during the execution of a script sequence (while maintaining the cumulative effect of commands executed prior to that time).

The operation of the "rewind" command will now be described. Before the "rewind" command is issued, part of the script sequence has already been executed. For example, if the status of script sequence 150 is currently at row 168, the screen of monitor 120 should show a square object having a blue color. The user can move cursor 128 to the playback-head column 152 of row 162, which is above row 168, and click on mouse 114 to rewind script sequence 150. Sequence player object 220 instructs conductor object 210 to issue messages to all the children of sequence player object 220 to remove themselves. As explained above, oval object 122, square object 123, and the sound object contain tags indicating that they are children of sequence player object 220. As a result, these objects can be identified and removed easily. Script sequence 150 is then executed again from the beginning, i.e., row 160. The time of sequence player object 220 is set to 10 units (i.e., the value of time indicated by row 162). As explained above, script sequence 150 "skips ahead" to row 162. From the viewpoint of the user, the system rewinds to a time equal to 10 units.

In the above described embodiment of the "rewind" command, script sequence 150 is executed from the beginning after all the existing objects have been removed. It is also possible to execute the script sequence from a predetermined point in time utilizing a technique called a "key frame" scheme. This method is especially advantageous when a large number of commands needs to be executed to "skip ahead" from the beginning to the designated time.

A key frame at a specified time can be generated automatically by computer system 100 after a script sequence is initiated and reaches the specified time. Computer system 100 asks all the objects existing at the specified time to generate code that would replicate their current state. Note that global and other non-object states of computer system 100 may need to be preserved. An example of a software product that can generate the above described code for the key frame is "Hot Draw" written by Kent Beck and Ward Cunningham. This software is widely available, and the details of which are not described here. The code for the key frame becomes an auxiliary script (the key frame script) which is associated with the state of the environment at the specified time. The script sequence can be executed starting from the key frame script as if the script sequence were executed from the beginning to the specified time.

The following example will illustrate a key frame script (shown in FIG. 2 as numeral 174) corresponding to one of the rows, say row 168, of script sequence 150, i.e., at time "0100." Script sequence 150 is executed in the regular manner from time "0000" to "0100." At that time, the screen of monitor 120 shows a blue square only. The script which generates the same state is "Create square, square color (blue)." Consequently, key frame script 174 for time "0100" is "Create square, square color (blue)." As can be seen from this example, the key frame script can be used to replace a lengthy script which requires a long time to execute, thereby making the skip ahead operation more efficient.

The script sequence 150 of FIG. 2 is written in an event editor format. It is also possible to write a script sequence in a programming language format. In a programming language embodiment of key frames, the key frame script could be placed at the beginning of the script sequence with an appropriate conditional test based on the time to which the player will skip ahead (e.g., if skip ahead time >50, then execute key frame script and jump to appropriate position in script sequence).

In order to include time-based information in the programming language normally used in a computer system, two new commands are added: a "wait" command and an "await" command.

The "wait" command causes the system to wait for a specified number of units of time starting from the end of the last "wait" command. The "await" command causes the system to wait for the occurrence of a specified absolute time. As discussed above in the event editor example, neither command will have any effect if the specified time interval has already elapsed.

The script sequence 150 of FIG. 2 can be written in programming language format utilizing both "wait" and "await" commands as follows:

Create oval, oval color (black);
Wait (10 units);
Oval color (green);
Wait (20 units);
Oval color (red), create square, square color (black);
Await (55 units);
Create "hello" sound, remove oval;
Wait (45 units);
Square color (blue);
Wait (10 units);
Square color (yellow).

The script sequence according to the present invention can also incorporate conditional commands. FIG. 4 is a script sequence 300, in programming language format, including conditional commands. Script sequence 300 starts with a statement creating an oval object at the origin, i.e., x=O and y=O. The second statement is a wait command causing script sequence 300 to wait for ten time units before the third statement is executed. The third statement causes the oval object to execute movements at five different times. Each movement is one unit in the horizontal position and occurs ten time units apart. Thus, the third statement of script sequence 300 is a conditional command because the execution of the command depends on the number of times the movement has occurred. The fourth statement of script sequence 300 causes the oval object to be removed. Other conditional constructs well known in the art (e.g., "if-then-else") can of course also be included using this same mechanism for time control and synchronization.

When script sequence 300 is executed (e.g., by clicking on icon 136), the time of sequence player object 220 is set to zero. An oval object, such as oval object 122 of FIG. 1, is created. After the time of sequence player object 220 is advanced to ten time units, conductor object 210 is notified that oval object 122 should be moved one length unit in the horizontal direction. Computer system 100 then waits for ten more time units. When the time of sequence player object 220 has advanced to twenty time units, conductor object 210 is again notified that oval object 122 should be moved one length unit in the horizontal direction. This "perform" loop repeats five times. Afterward, oval object 122 is removed from the list of conductor object 210.

It can be seen from the above examples that the script sequence according to the present invention provides flexibility in programming which is not available in prior art time-based sequences. The script sequence of the present invention retains all the features of existing programming languages designed for a multimedia system, including conditional statements. On the other hand, existing time-based programming environments do not provide for precise control, maintenance and synchronization of time with arbitrary sequences of code, as shown in the "for" loop example above. Further, the script sequence is not limited to the capabilities of a small set of objects, as is the case in MacroMind Director. As a result, multimedia authors are able to create titles in a more flexible and powerful manner.

Even though the script sequence of the present invention is more flexible and contains more features than existing time-based programming environments, the performance does not suffer. As explained above, the incorporation of key frames in the sequence reduces the time for performing skip ahead and rewind operations. Consequently, the efficiency of the script sequence in accordance with the present invention improves.

It should be understood that while the present invention has been specifically set forth and described with reference to the preferred embodiments, it will be readily appreciated by those skilled in the art that many changes in form and detail may be made without departing from the spirit and scope of the present invention as set forth in the appended claims.

What is claimed is:

1. A method for rewinding a time-based script, for use with a plurality of data objects each having a state, the script comprising an ordered sequence of commands for modifying the state of one or more of the data objects over time, each command associated with a corresponding time value, and one or more of the commands being conditional, said method comprising the following steps:

generating a sequence of time values in real-time, using a clock, starting from an initial time value;

executing, using a digital computer, the script command associated with each generated time value, at least one of the associated script commands being conditional;

interactively specifying a desired time value earlier than a currently generated time value;

restoring each data object to its state as of the initial time value, using the digital computer;

after the preceding step, skipping ahead to the desired time value by restoring each data object to its state as of the desired time value, in less time than the difference between the initial time value and the desired time value; and resetting the clock to the desired time value, thereby rewinding the time-based script to the desired time value.

2. The method of claim 1, wherein the step of skipping ahead to the desired time value includes the step of executing a key frame script reflecting a modification of each data object by commands associated with time values earlier than the desired time value.

3. The method of claim 1, wherein the step of skipping ahead to the desired time value includes the step of performing each command associated with a time value earlier than the desired time value.

4. The method of claim 1, wherein one or more of the commands for modifying the state of the data objects comprise one or more iterative loops.

5. The method of claim 1, wherein one or more of the commands for modifying the state of the data objects comprise one or more "if-then-else" statements.

6. The method of claim 1, wherein the maximum number of data objects modified by the commands of the time-based script depends only upon the digital computer used.

7. A digital computer-based apparatus for rewinding a time-based script, the script comprising an ordered sequence of commands, each command associated with a corresponding time value, said apparatus comprising:

a plurality of data objects, each one of the data objects having a state, the commands being operable to modify said states, and one or more of the commands being conditional;

a clock for generating a sequence of time values in real-time, starting from an initial time value;

means for executing the script command associated with each generated time value, at least one of the associated script commands being conditional;

means for interactively specifying a desired time value earlier than the currently generated time value;

means for restoring each data object to its state as of the initial time value;

means for skipping ahead to the desired time value in the script sequence, by restoring each data object to its state as of the desired time value, in less time than the difference between the initial time value and the desired time value; and means for resetting the clock to the desired time value, thereby rewinding the time-based script to the desired time value.

* * * * *